Oct. 25, 1955 T. DANIEL 2,721,681
LUGGAGE CARRIER AND PICNIC TABLE
Filed June 8, 1953 2 Sheets-Sheet 1
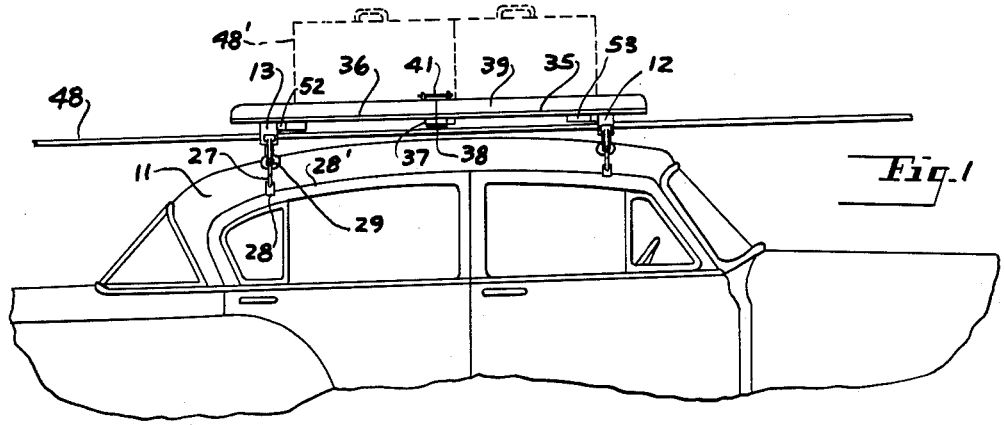
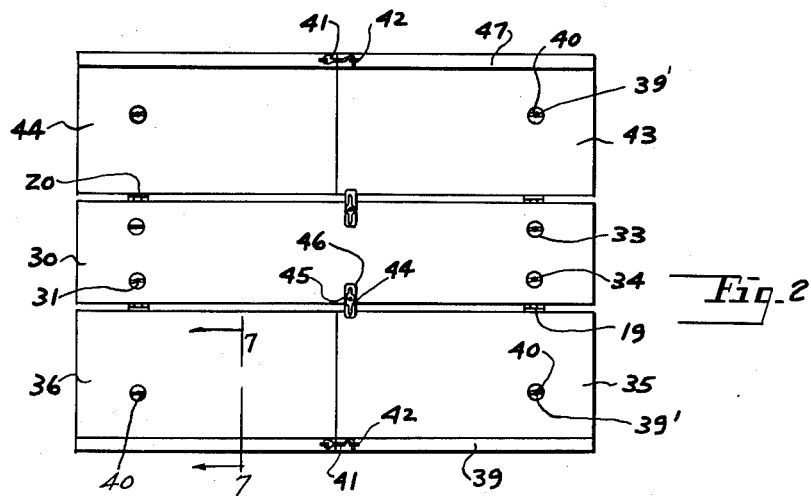
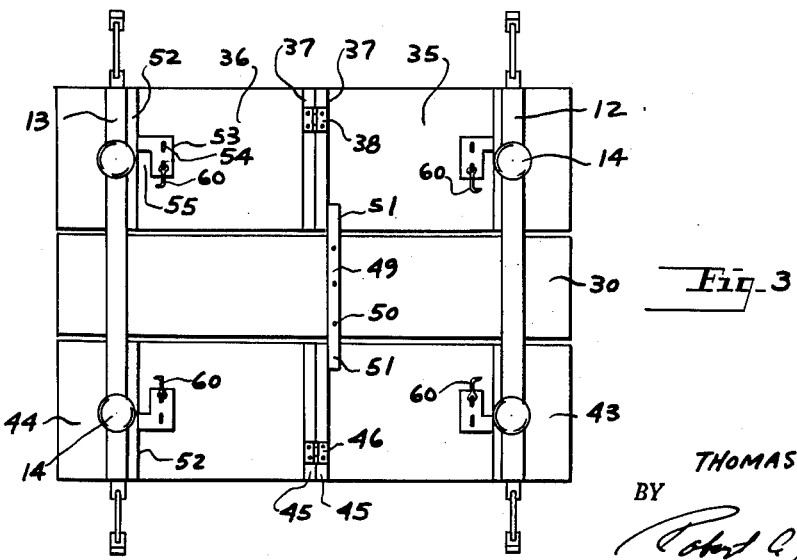
INVENTOR.
THOMAS DANIEL
BY
ATTORNEY Oct. 25, 1955        T. DANIEL        2,721,681
LUGGAGE CARRIER AND PICNIC TABLE
Filed June 8, 1953        2 Sheets-Sheet 2
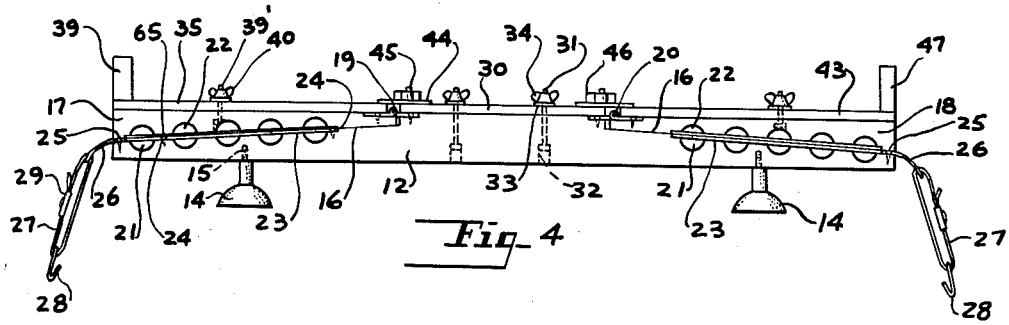
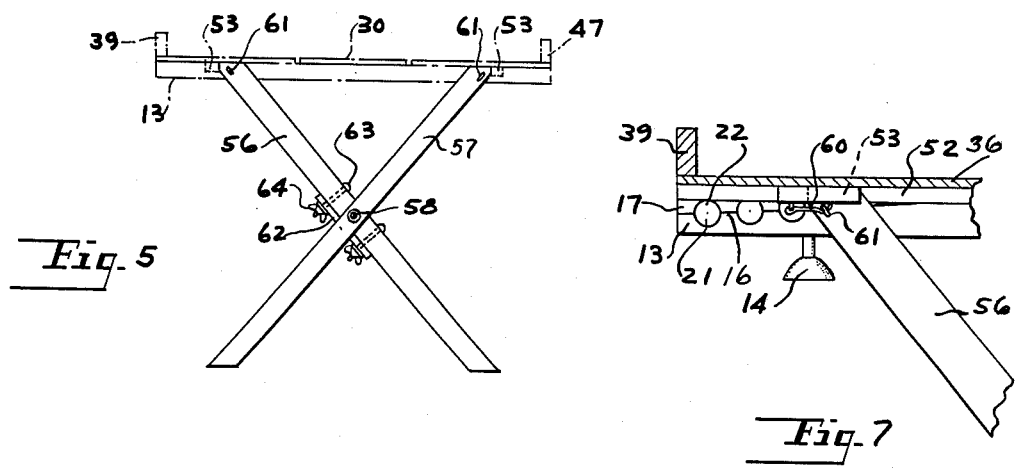
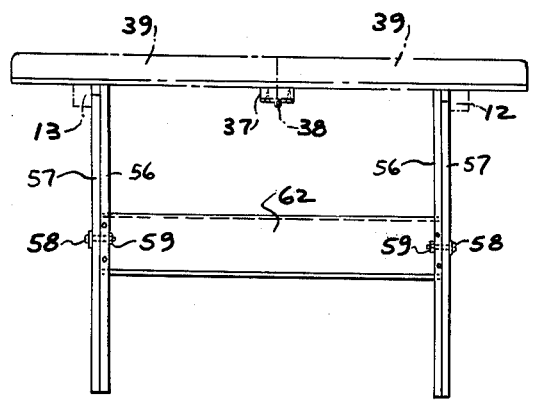
INVENTOR.
THOMAS DANIEL
BY
Robert G. Sloman.
ATTORNEY.

United States Patent Office 2,721,681
Patented Oct. 25, 1955

2,721,681

LUGGAGE CARRIER AND PICNIC TABLE

Thomas Daniel, Detroit, Mich.

Application June 8, 1953, Serial No. 360,020

6 Claims. (Cl. 224—42.1)

This invention relates to a luggage carrier and combination picnic table, and more particularly to a luggage carrier adapted for positioning upon the roof of a vehicle, and which when removed may be converted into a picnic table.

It is the object of the present invention to provide a simplified construction of luggage carrier which may be collapsed, if desired, for storing, and which is easily attachable to the roof of the vehicle.

This and other objects will be seen from the following specification and claims in conjunction with the appended drawings, in which:

Fig. 1 is a fragmentary side elevational view of a vehicle, i. e., an automobile, illustrating the positioning of the present luggage carrier upon the roof thereof.

Fig. 2 is a top plan view of the luggage carrier.

Fig. 3 is a bottom plan view thereof.

Fig. 4 is a right end elevational view of the luggage carrier shown in Fig. 1.

Fig. 5 is an end elevational view of the device when converted to a picnic table.

Fig. 6 is a side elevational view thereof; and

Fig. 7 is a section taken on line 7—7 of Fig. 2, illustrating the connection of the upper ends of the legs of the picnic table with the platform portion of the luggage carrier.

It will be understood that the above drawings illustrate merely a preferred embodiment of the invention, and that other embodiments are contemplated within the scope of the claims hereafter set forth.

Fig. 1 shows a vehicle with the roof thereof generally designated at 11, across which in longitudinally spaced relation are positioned a pair of transverse supports 12 and 13 which have depending rubber suction cups 14 extending from opposite ends thereof secured to said supports, as at 15, Fig. 4, and adapted for securing to roof 11.

Each of the supports 12 and 13 are cut-away along the line 16, to define the pivotal support elements 17 and 18, which are hinged as at 19 and 20 to the body of the supports 12 and 13, respectively, and which when in the horizontal position shown in Fig. 4, complete the support construction.

A plurality of semi-circular transverse slots 21 are arranged in longitudinal spaced relation and formed in the outer portion of the supports 12 and 13 corresponding to the cut-away line 16. A corresponding series of semi-circular slots 22 are formed in the undersurface of support elements 17 and 18 to thereby provide between the supports 12 and 13 aligned circular openings within which may be positioned and secured fishing rods or other implements, such as indicated at 48 in Fig. 1.

Flexible preferably leather straps 23 are secured as at 24 to the top surfaces of supports 12 and 13 along the lines 16. Metal straps 26 project outwardly from the ends of supports 12 and 13, being secured thereto at 25. Each of the members 26 have joined thereto the straps 27 with buckles 29, said straps having secured at their lower ends the gutter engaging clips 28 adapted for securing under the conventional gutter 28', Fig. 1. By this construction, the supports 12 and 13 are immovably retained in position upon a vehicle roof in cooperation with the securing and mounting cups 14.

Central platform 30 extends longitudinally across a substantial portion of the vehicle roof and is supported upon central portions of supports 12 and 13, and is secured thereto by the bolts 31 which extend up through said supports and are retained within notches 32 formed in the undersurfaces thereof. The bolts 31 extend through corresponding openings in platform 30 and receive the washers 33 and wing nuts 34, whereby platform 30 is removably secured in position.

Upon one side of platform 30 are a pair of longitudinally aligned platform elements 35 and 36, upon the undersurface of said platform elements at their registering ends are transverse blocks 37 and interconnecting the blocks is a hinge 38. Upon the top surface of platform elements 35 and 36 are a pair of longitudinally aligned upwardly projecting side walls 39, said platform elements 35 and 36 being secured to support element 17 as by the bolts 39' and wing nuts 40 with a suitable washer interposed.

Upon and interconnecting the registering ends of side walls 39 is the interconnected hook 41 and eye 42 for maintaining platform elements 35 and 36 in aligned relation. Upon the opposite side of platform 30 is a second pair of platform elements 43 and 44, with corresponding registering blocks 45 on their undersurfaces, as shown in Fig. 3, interconnected by the hinge 46; and it will be noted that here also a corresponding hook and eye 41 and 42 interconnects the top registering ends of the aligned upright side edges 47 on platform elements 43 and 44.

A transverse supporting strip 49 is secured to the undersurface of platform 30 across the central portion thereof by the fasteners 50, and the opposite ends 51 thereof supportingly project below the inner portions of platform elements 35 and 43.

Additional transverse elongated blocks 52 are secured to the undersurface of each of the platform elements 35, 36, 43 and 44 adjacent and against portions of the supports 12 and 13. These blocks cooperate with the L shaped blocks 53 secured at 54 to the undersurfaces of said platform elements defining the notch 55 adapted to retainingly receive the free upper ends of the crossed supporting legs 56 and 57 when the carrier is converted to a picnic table or other table.

There are a pair of crossed legs 56 and 57 adjacent each end of the platform with the respective upper ends of the legs positioned within each of the notches 55, illustrated in Fig. 3. The legs 56 and 57 are pivotally interconnected at their central portions by the bolt 58 and nut 59, shown in Figs. 5 and 6, and the upper end of each leg is secured to said block 53, as by the hook 60 and eye 61, as illustrated in Figs. 3, 5 and 7.

The elongated rectangular spacer board 62 interconnects the corresponding inner legs 56 at opposite ends of the table, and is secured at its opposite ends to the respective legs by the bolts 63 and wing nuts 64 to thereby complete the table construction.

Referring again to Fig. 4, upon the undersurface of platform elements 17 and 18 is arranged a second flexible, preferably leather strap 65 which extends across the openings 22, and is adapted for cooperation with straps 23 for retainingly receiving therebetween the fish pole 48 or other elongated element to be transported.

Fig. 1 also indicates in dotted lines the luggage 48', which may also be loaded upon the present luggage carrier and secured thereon in any convenient manner between the corrsponding upright side edges 39 and 47.

Having described my invention, reference should now be had to the claims which follow for determining the scope thereof.

I claim:

1. A vehicle roof article carrier comprising a pair of elongated longitudinally spaced cross supports adapted to extend transversely across a vehicle roof and having central body portions, a longitudinally extending platform bridging said body portions and secured thereto, the opposite upper ends of each support outwardly of said body portions including a separate support element hinged at its inner end to said body portions, and pairs of longitudinally aligned platform elements, each pair hinged together and arranged upon opposite sides of said platform and removably secured to corresponding support elements.

2. The carrier of claim 1, there being a series of longitudinally aligned transverse apertures in the top surfaces of said supports below said support elements and closed thereby for receiving therebetween elongated articles to be transported.

3. The carrier of claim 1, there being a series of longitudinally aligned transverse apertures in the top surfaces of said supports below said support elements and corresponding transverse apertures in the under-surfaces of said support elements registering with said first apertures for receiving therebetween elongated articles to be transported.

4. The carrier of claim 1, there being a series of longitudinally aligned transverse apertures in the top surfaces of said supports below said support elements and corresponding transverse apertures in the under-surfaces of said support elements registering with said first apertures, and separable elongated flexible article engaging elements mounted on the registering surfaces of said supports and support elements bridging said apertures and oppositely yieldable in the said apertures for retainingly grasping therebetween elongated articles to be transported.

5. The carrier of claim 1, and longitudinally aligned upright side walls mounted along the outer longitudinal edges of said platform elements for receiving luggage therebetween.

6. The carrier of claim 1, longitudinally aligned upright side walls mounted along the outer longitudinal edges of said platform elements for receiving luggage therebetween, and fastening means interconnecting corresponding side walls of each pair of said platform elements.

References Cited in the file of this patent

UNITED STATES PATENTS

| | | |
|---|---|---|
| 1,625,916 | Slater | Apr. 26, 1927 |
| 2,440,821 | Goodwin | May 4, 1948 |
| 2,567,104 | Di Fonzo | Sept. 4, 1951 |
| 2,630,257 | Nielson | Mar. 3, 1953 |

FOREIGN PATENTS

| | | |
|---|---|---|
| 852,505 | France | Oct. 30, 1939 |